US007568293B2

(12) United States Patent
Ferrari

(10) Patent No.: US 7,568,293 B2
(45) Date of Patent: Aug. 4, 2009

(54) SEALED BATTERY FOR COORDINATE MEASUREMENT MACHINE

(76) Inventor: Paul Ferrari, 81 Skymail Ave., Carlsbad, CA (US) 92011

( * ) Notice: Subject to any disclaimer, the term of this patent is extended or adjusted under 35 U.S.C. 154(b) by 0 days.

(21) Appl. No.: 11/743,068

(22) Filed: May 1, 2007

(65) Prior Publication Data

US 2007/0256311 A1    Nov. 8, 2007

Related U.S. Application Data

(60) Provisional application No. 60/796,973, filed on May 1, 2006.

(51) Int. Cl.
*G01B 5/004* (2006.01)
(52) U.S. Cl. .......................... 33/503; 33/556
(58) Field of Classification Search .................. 33/503, 33/556, 558, 559
See application file for complete search history.

(56) References Cited

U.S. PATENT DOCUMENTS

| 5,084,981 | A | 2/1992 | McMurtry et al. |
|---|---|---|---|
| 5,088,337 | A | 2/1992 | Bennett |
| 5,148,377 | A | 9/1992 | McDonald |
| 5,187,874 | A | 2/1993 | Takahashi et al. |
| 5,189,797 | A | 3/1993 | Granger |
| 5,396,712 | A | 3/1995 | Herzog |
| 5,408,754 | A | 4/1995 | Raab |
| 5,412,880 | A | 5/1995 | Raab |
| 5,505,003 | A | 4/1996 | Evans et al. |
| 5,510,977 | A | 4/1996 | Raab |
| 5,521,847 | A | 5/1996 | Ostrowski et al. |
| 5,528,505 | A | 6/1996 | Granger et al. |
| 5,611,147 | A | 3/1997 | Raab |
| 5,615,489 | A | 4/1997 | Breyer et al. |
| 5,757,499 | A | 5/1998 | Eaton |
| 5,768,792 | A | 6/1998 | Raab |
| 5,794,356 | A | 8/1998 | Raab |
| 5,822,450 | A | 10/1998 | Arakawa et al. |
| 5,829,148 | A | 11/1998 | Eaton |
| 5,978,748 | A | 11/1999 | Raab |
| 5,991,704 | A * | 11/1999 | Rekar et al. .................. 33/556 |
| 6,134,506 | A | 10/2000 | Rosenberg et al. |

(Continued)

FOREIGN PATENT DOCUMENTS

DE        4345091 A1    7/1995

(Continued)

*Primary Examiner*—Yaritza Guadalupe-McCall
(74) *Attorney, Agent, or Firm*—Knobbe, Martens, Olson & Bear LLP

(57) ABSTRACT

A coordinate measurement machine can include a battery positioned at least partially within the base of the machine. The battery allows operation of the coordinate measurement machine in locations that are remote from an AC power supply. The battery can be rechargeable and can be positioned in a battery adapter that serves as a battery charger. The coordinate measurement machine can also include a cover to enclose the battery within the base. The cover can include one or more sealing members to keep contaminants and other external objects away from the battery. The cover can be fastened to be base, for example, with bolts. The sealing members can be o-rings, gaskets, silicon membranes, seals, sealants, or another material. This sealed cover can meet or exceed industry standards for the protection of electrical components, such as ingress protection standard IP65 as administered by the International Electrotechnical Commission.

9 Claims, 6 Drawing Sheets

U.S. PATENT DOCUMENTS

| | | | |
|---|---|---|---|
| 6,161,079 A | 12/2000 | Zink et al. | |
| 6,219,928 B1 | 4/2001 | Raab et al. | |
| 6,366,831 B1 | 4/2002 | Raab | |
| 6,598,306 B2 | 7/2003 | Eaton | |
| 6,611,346 B2 | 8/2003 | Granger | |
| 6,611,617 B1 * | 8/2003 | Crampton | 382/154 |
| 6,618,496 B1 | 9/2003 | Tassakos et al. | |
| 6,668,466 B1 | 12/2003 | Bieg et al. | |
| 6,817,108 B2 | 11/2004 | Eaton | |
| 6,892,465 B2 | 5/2005 | Raab et al. | |
| 6,904,691 B2 | 6/2005 | Raab et al. | |
| 6,925,722 B2 | 8/2005 | Raab et al. | |
| 6,931,745 B2 | 8/2005 | Granger | |
| 6,935,036 B2 * | 8/2005 | Raab et al. | 33/503 |
| 6,952,882 B2 | 10/2005 | Raab et al. | |
| 6,984,236 B2 | 1/2006 | Raab | |
| 6,988,322 B2 | 1/2006 | Raab et al. | |
| 7,003,892 B2 | 2/2006 | Eaton et al. | |
| 7,017,275 B2 | 3/2006 | Raab et al. | |
| 7,043,847 B2 | 5/2006 | Raab et al. | |
| 7,051,450 B2 | 5/2006 | Raab et al. | |
| 7,073,271 B2 * | 7/2006 | Raab et al. | 33/503 |
| 7,152,456 B2 | 12/2006 | Eaton | |
| 7,174,651 B2 | 2/2007 | Raab et al. | |
| 7,246,030 B2 | 7/2007 | Raab et al. | |
| 7,269,910 B2 | 9/2007 | Raab et al. | |
| 7,296,979 B2 | 11/2007 | Raab et al. | |
| 7,313,264 B2 * | 12/2007 | Crampton | 382/154 |
| 7,372,581 B2 | 5/2008 | Raab et al. | |
| 2005/0166413 A1 * | 8/2005 | Crampton | 33/503 |
| 2006/0053647 A1 * | 3/2006 | Raab et al. | 33/503 |
| 2007/0063500 A1 * | 3/2007 | Eaton | 280/762 |

FOREIGN PATENT DOCUMENTS

| | | |
|---|---|---|
| DE | 101 12 977 | 11/2002 |
| EP | 0522610 A1 | 1/1993 |
| FR | 2740546 | 4/1997 |
| GB | 2274526 A | 7/1994 |
| JP | 04-032393 | 2/1992 |
| JP | 404057690 | 2/1992 |
| JP | 05-031685 | 2/1993 |
| JP | 2003-021133 | 1/2003 |
| JP | 2003175484 | 6/2003 |
| JP | 2003275484 | 9/2003 |
| JP | 2006-214559 | 8/2006 |
| WO | WO 98/08050 | 2/1998 |

* cited by examiner

SEALED BATTERY FOR COORDINATE MEASUREMENT MACHINE

CROSS-REFERENCE TO RELATED APPLICATION

This application claims the benefit of U.S. Provisional Patent Application No. 60/796,973, entitled "SEALED BATTERY FOR COORDINATE MEASUREMENT MACHINE," filed on May 1, 2006.

Also, this application hereby incorporates by reference the above-identified provisional application, in its entirety.

BACKGROUND OF THE INVENTION

1. Field of the Invention

The present application relates to measuring devices, and more particularly, articulated arm coordinate measurement machines for measuring the coordinates of three-dimensional objects.

2. Description of the Related Art

Rectilinear measuring systems, also referred to as coordinate measuring machines (CMM's) and articulated arm measuring machines including portable coordinate measuring machines (PCMM's) have been described for generating geometry information from various objects and areas. In general, these instruments capture the structural characteristics of an object for use in electronic rendering and duplication. One example of a conventional apparatus used for coordinate data acquisition comprises a support and a moveable measuring arm made up of hinged segments to which a contact-sensitive probe or remote scanning device is attached.

Geometry information or three-dimensional coordinate data characterizing the shape, features, and size of the object may be acquired by tracing or scanning along the object's surface and contours. Probe or scanning device movement is typically tracked relative to a reference coordinate system resulting in a collection of data points and information that may be used to develop an accurate electronic rendering of the object. In conventional implementations, the acquired geometry information is processed by a computer capable of making use of the information to model the surface contours and dimensions of the object.

SUMMARY OF THE INVENTION

In one embodiment, a coordinate measurement apparatus comprises a base configured to at least contain one or more removable batteries, a cover member configured to be secured to the base and one or more seal members situated between the base and the cover member. In one arrangement, the cover member of the coordinate measurement apparatus substantially encloses the removable battery. In another embodiment, the coordinate measurement apparatus further comprises one or more securement members which are configured to secure the cover to the base. In yet another embodiment, the securement member is a bolt.

In some embodiments, the seal member situated between the base and the cover is a gasket, an o-ring, a silicone membrane, a seal, a sealant and/or the like. In another arrangement, the cover is configured to prevent moisture from contacting the battery. In one embodiment, the cover is configured to prevent dust from contacting the battery. In another embodiment, the seal member is attached to the cover. In yet another embodiment, the cover is configured to satisfy at least one industry accepted standard for the enclosure of electrical components. In one embodiment, the cover is configured to meet the Ingress Protection 65 (IP65) standard.

BRIEF DESCRIPTION OF THE DRAWINGS

Further objects, features and advantages of the invention will become apparent from the following detailed description taken in conjunction with the accompanying figures showing illustrative embodiments of the invention, in which.

DETAILED DESCRIPTION OF THE PREFERRED EMBODIMENTS

Figure 1:
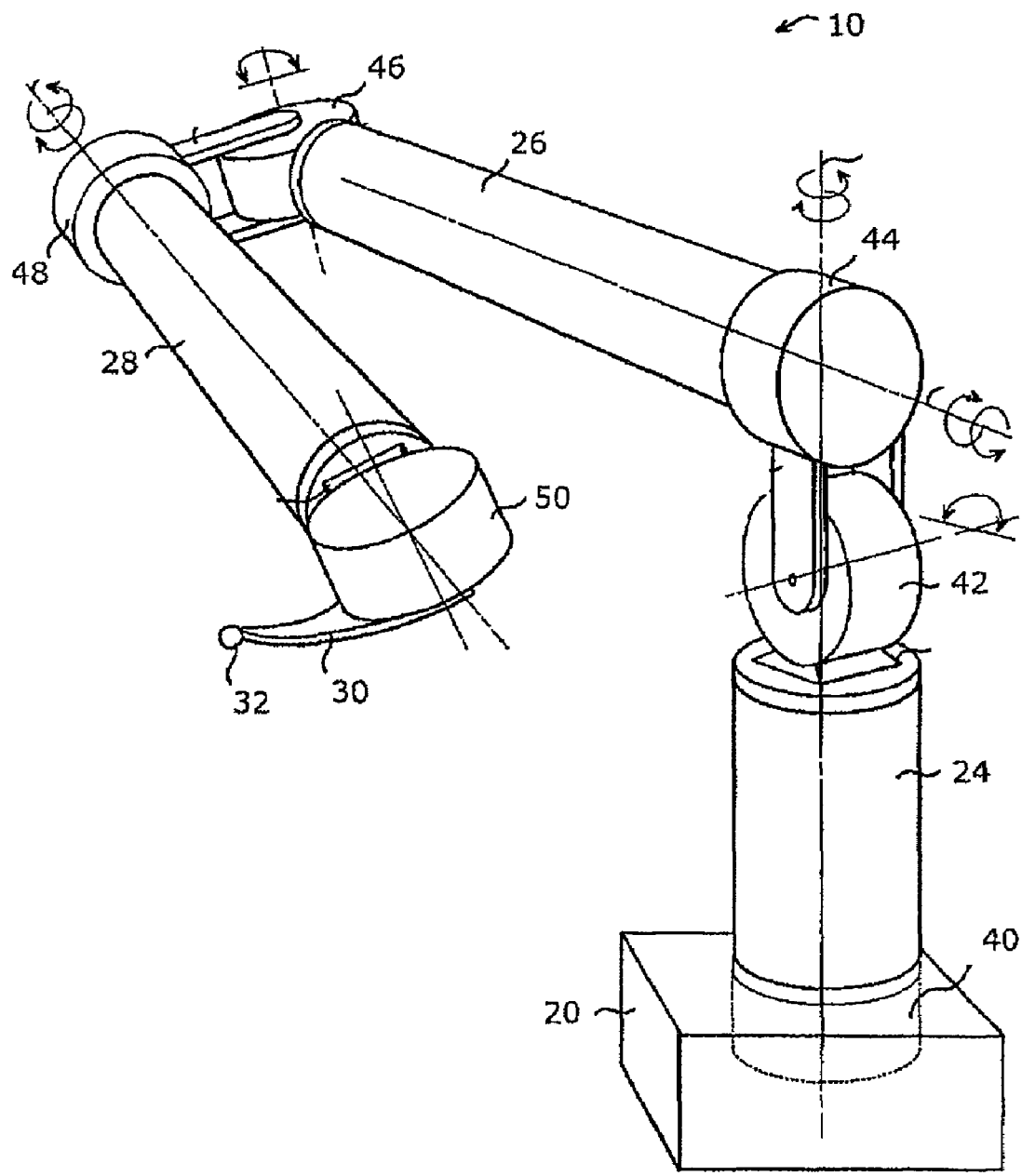
FIG. 1 is a perspective view of an embodiment of coordinate measuring machine.

FIG. 1 illustrates one embodiment coordinate measuring machine (CMM) 10. In the illustrated embodiment, the CMM 10 comprises a base 20, a plurality of rigid transfer members 24, 26, 28, a coordinate acquisition member 30 and a plurality of articulation members 40, 42, 44, 46, 48, 50 connecting the rigid transfer members 24, 26, 28 to one another. Each articulation member is configured to impart one or more rotational and/or angular degrees of freedom. Through the various articulation members 40, 42, 44, 46, 48, 50, the CMM 10 can be aligned in various spatial orientations thereby allowing fine positioning of the coordinate acquisition member 110 in three dimensional space.

The position of the rigid transfer members 24, 26, 28 and the coordinate acquisition member 30 may be adjusted using manual, robotic, semi-robotic and/or any other adjustment method. In one embodiment, the CMM 10, through the various articulation members, is provided with seven rotary axes of movement. It will be appreciated, however, that there is no strict limitation to the number of axes of movement that may be used, and fewer or additional axes of movement may be incorporated into the CMM design.

In various embodiments, the coordinate acquisition member 30 comprises a contact sensitive member or probe 32 configured to engage the surfaces of a selected object and generate coordinate data on the basis of probe contact. Alternatively, the coordinate acquisition member 30 may comprise a remote scanning and detection component that does not necessarily require direct contact with the selected object to acquire geometry data. In one embodiment, a laser coordinate detection device (e.g., laser camera) may be used to obtain geometry data without direct object contact. It will be appreciated that various coordinate acquisition member configurations including: a contact-sensitive probe, a remote-scanning probe, a laser-scanning probe, a probe that uses a strain gauge for contact detection, a probe that uses a pressure sensor for contact detection, a probe that used an infrared beam for positioning, and a probe configured to be electrostatically-responsive may be used for the purposes of coordinate acquisition.

In other embodiments, one or more of the rigid transfer members 24, 26, 28 comprise a composite structure that includes an inner portion and an outer exoskeletal portion. In such an arrangement, the inner portion of the rigid transfer members 24, 26, 28 are interconnected to one another through articulation members that provide the ability to position the coordinate acquisition member 30 in a variety of different orientations in three dimensional space. The outer portions surrounding the various inner portions of the rigid transfer members 24, 26, 28 form an environmental barrier that at least partially encloses segments of the inner portions. In one aspect, the inner portions are configured to "float" inside the corresponding outer portions.

As is known in the art, the position of the probe 32 in space at a given instant can be calculated by knowing the length of each member and the specific position of each of the articulation members 40, 42, 44, 46, 48, 50. Each of the articulation members 40, 42, 44, 46, 48, 50 can be broken down into a singular rotational degree of motion, each of which is measured using a dedicated rotational transducer. Each transducer outputs an signal (e.g., an electrical signal), which varies according to the movement of the 40, 42, 44, 46, 48, 50 in its degree of motion. The signal can be carried through wires or otherwise transmitted to a the base 20. From there, the signal can be processed and/or transferred to a computer for determining the position of the probe 32 in space.

In one embodiment, the transducer can comprise an optical encoder. In general, each encoder measures the rotational position of its axle by coupling is movement to a pair of internal wheels having successive transparent and opaque bands. In such embodiments, light can be shined through the wheels onto optical sensors which feed a pair of electrical outputs. As the axle sweeps through an arc, the output of the analog encoder can be substantially two sinusoidal signals which are 90 degrees out of phase. Coarse positioning can occur through monitoring the change in polarity of the two signals. Fine positioning can be determined by measuring the actual value of the two signals at the instant in question. In certain embodiments, maximum accuracy can be obtained by measuring the output precisely before it is corrupted by electronic noise. Additional details and embodiments of the illustrated embodiment of the CMM 10 can be found in U.S. Pat. No. 5,829,148, the entirety of which is hereby incorporated by reference herein.

Figure 2:
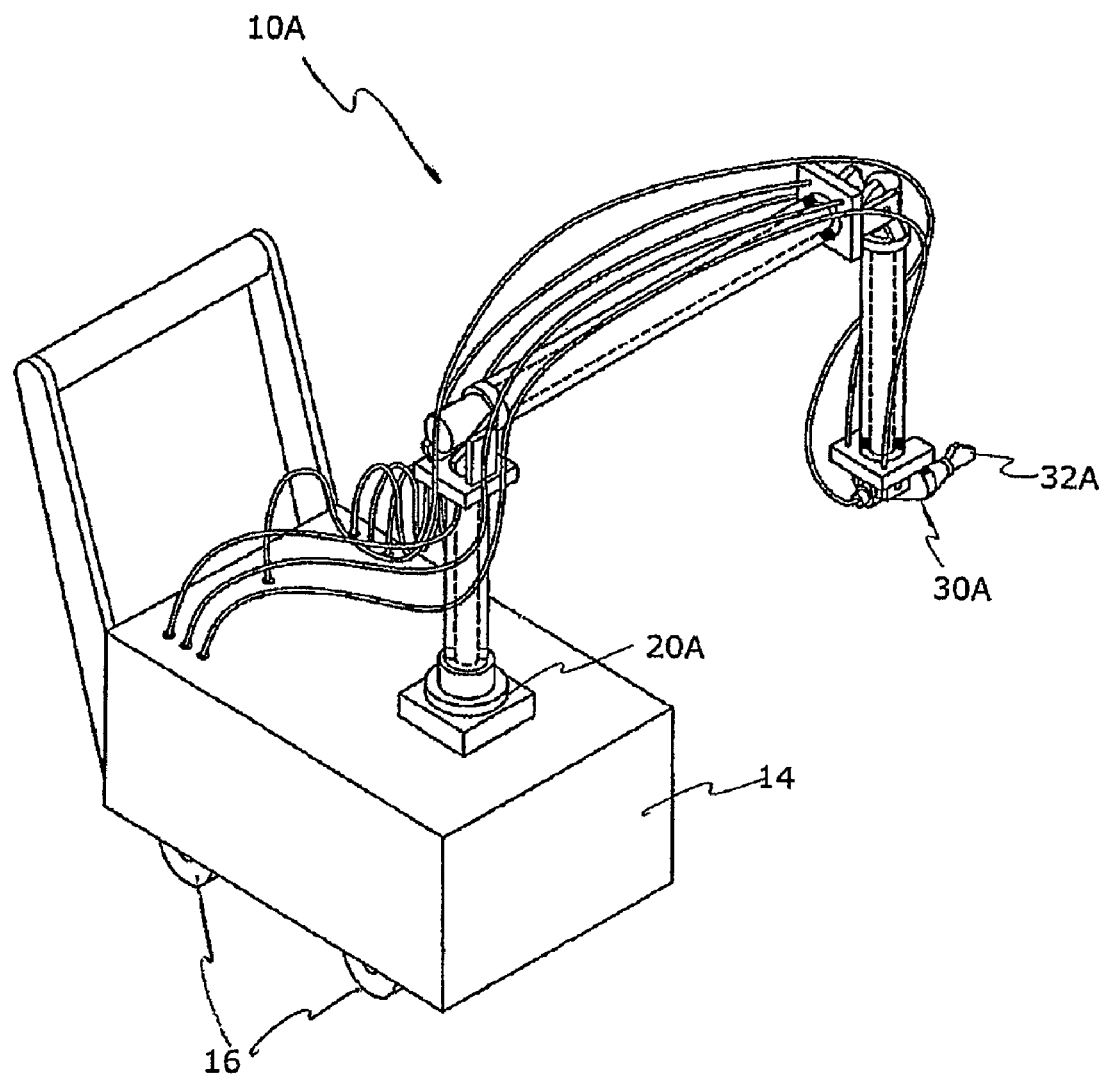
FIG. 2 is a perspective view of another embodiment coordinate measuring machine according to another embodiment.
Figure 3:
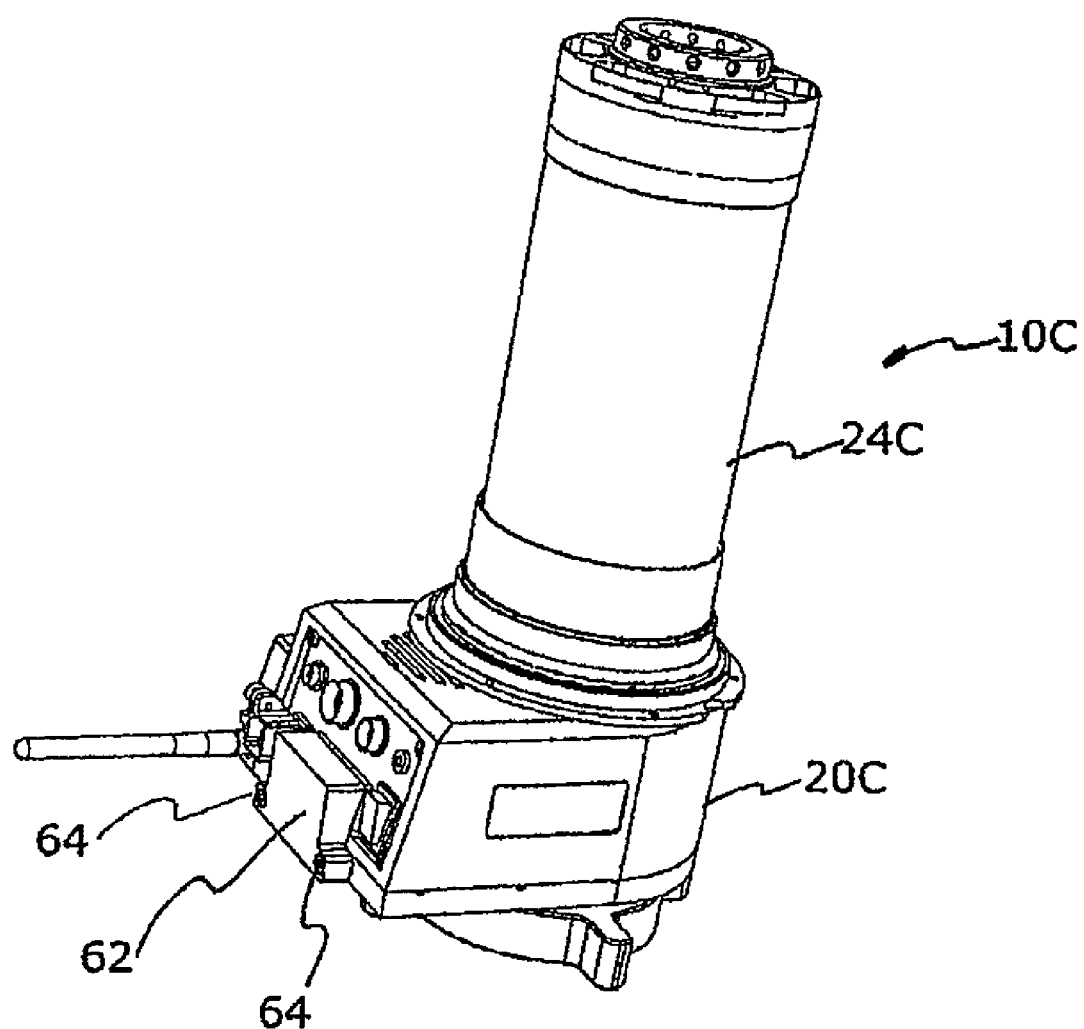
FIG. 3 is a perspective view of a embodiment base portion of a coordinate measuring machine.
Figure 4:
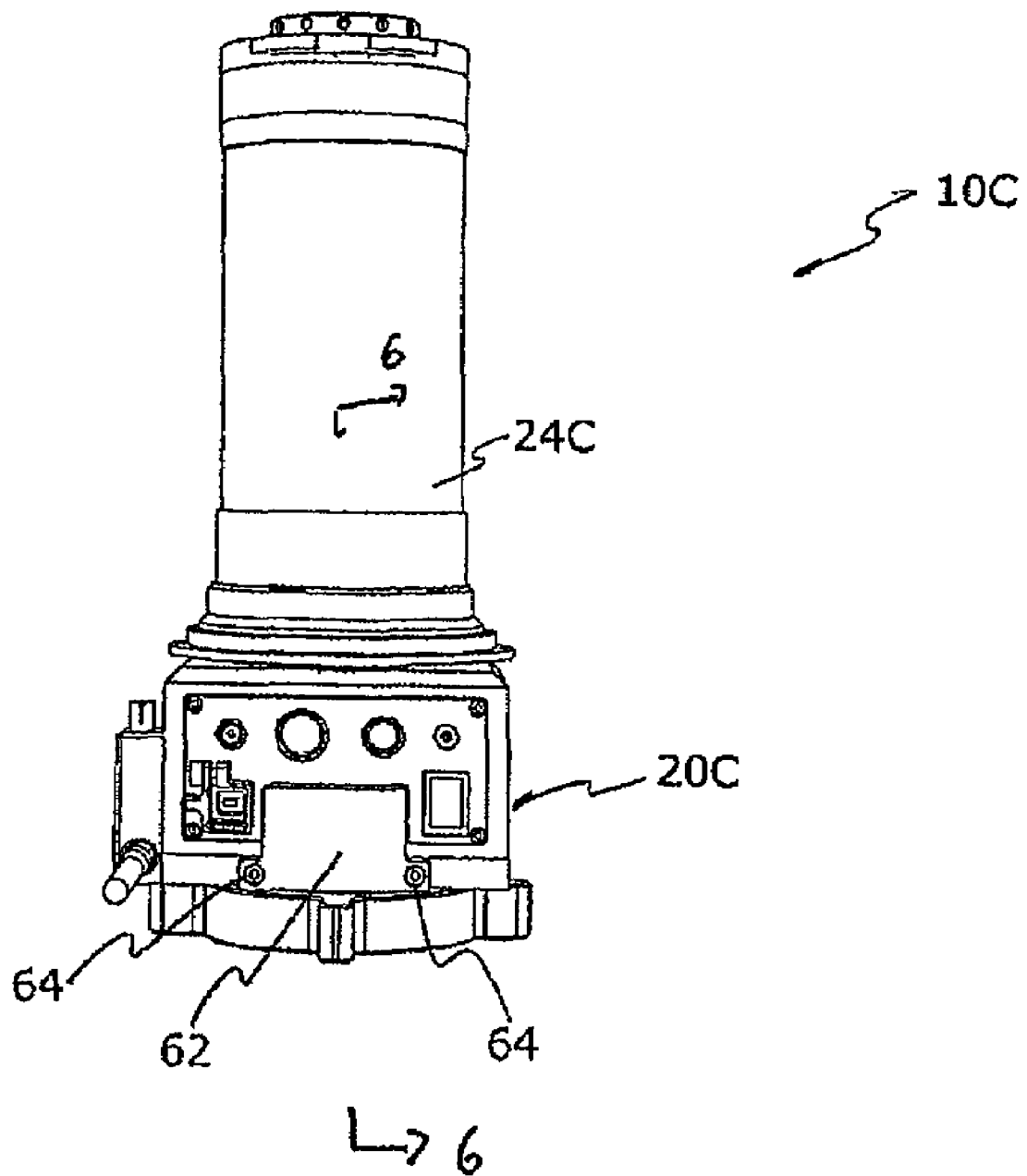
FIG. 4 is a front elevation view of the base portion illustrated in FIG. 3.
Figure 5:
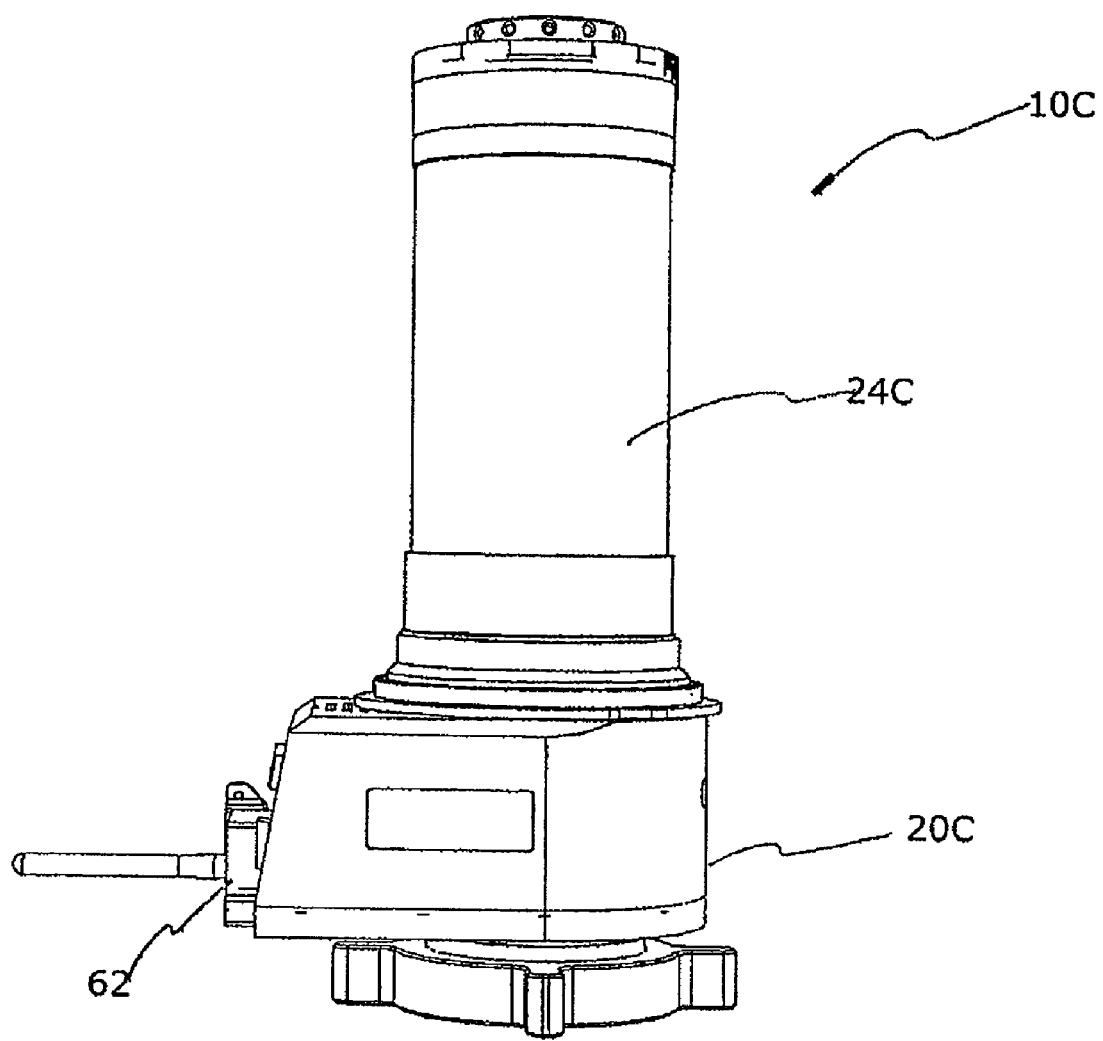
FIG. 5 is a side elevation view of the base portion illustrated in FIG. 3.

In one embodiment, the base 20 of the CMM 10 may be situated on a support surface, such as a table, floor, wall or any other stable surface. In another embodiment, as shown in FIG. 2, the base 20A may be positioned on a mobile unit 14, allowing the CMM 10A to be conveniently moved from one location to another. In such arrangements, the base 20A may be secured to the mobile unit 14 in a fixed manner (e.g. bolted, fastened or otherwise attached at one or more locations). Further, the mobile unit 14 may be configured with retractable or drop-down wheels 16 that facilitate in moving the CMM 10A. When properly positioned at the desired location, the wheels 16 may be retracted and rigid support legs (not shown) may be used to secure the CMM 10A in a fixed and stable position in preparation for the acquisition of coordinate data. Additional details of this embodiment of the CMM 10 can be found in U.S. Patent Publication 2005-015012, the entirety of which is hereby incorporated by reference herein.

FIGS. 3-6 are front perspective, front, side and cross-sectional views of an embodiment of a base portion 20B, which can be used in combination with the CMM 10, 10A embodiments described above or other CMM devices. In the illustrated embodiment, the base portion 20C includes a battery 60 (see FIG. 6) that is positioned at least partially within a receptacle 61 in the base 20B to supply a portion or all of the necessary electrical output to operate the device. The use of batteries 60 is particularly useful for portable CMMs that may not have easy or convenient access to a standard AC power supply during use.

In the illustrated embodiment, the battery 60 can be removed from the base 20B for replacement, external recharging or any other purpose. For cost-savings and other practical considerations, the battery 60 is preferably rechargeable. Types of rechargeable batteries can include nickel cadmium (Ni-Cad), nickel metal hydride (Ni-MH), lithium batteries or the like. Alternatively, those of skill in the art recognize that single use batteries may also be used. It will be appreciated that a single CMM may include two or more batteries 60. In addition, in modified embodiments, the one or more batteries 60 may be situated in any other suitable portion of the CMM besides the base 20B.

In an embodiments, rechargeable batteries used in a CMM device may be advantageously housed within a battery adapter that also serves as a battery charger. Thus, in one embodiment, the battery 60 is recharged while secured within the CMM 20C by simply attaching the CMM 20C to an external power supply (e.g., AC power source). In another embodiment, the CMM 20B can be configured so that the battery 60 is recharged by an external charger.

Figure 6:
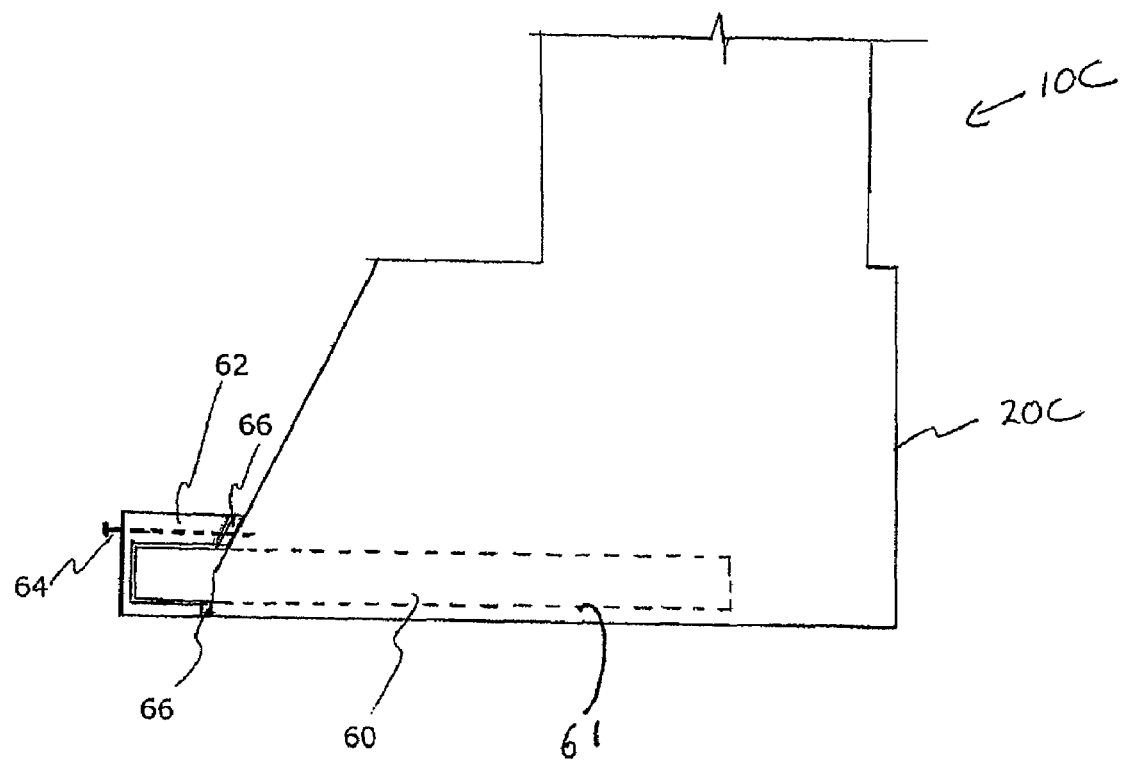
FIG. 6 is a schematic cross-sectional view of the base portion taken along line 6-6 of FIG. 4.

In the illustrated embodiment, the battery 60 can be configured to be positioned within receptacle 61 in the base 20C or another other part of the CMM 10C. With particular reference to FIG. 6, the battery 60 can be positioned in the receptacle 61 near the bottom of the base 20B on a front portion of the CMM 10C. To ensure that the battery 60 has been properly positioned within the slot or adapter, a snap fit or another type of positive engagement or locking mechanism can be optionally provided.

As shown in FIG. 6, in the illustrated embodiment, the CMM 10C includes a cover 62 configured to enclose the battery 60 within the base 20B. The cover 62 is preferably sized and shaped to snugly fit over the battery 60 and the adjacent surfaces of the CMM 10B so as to completely conceal the battery within the base 20B. In one embodiment, one or more sealing members 66 are included between the cover 62 and the outer surface of the base 20B or other surface of the CMM 10B. This is particularly important for CMMs that are used in environments where contaminants and other outside elements (e.g., dust, water, etc.) are present. In such situations, it is important to keep contaminants away from electrical and other sensitive internal components of the CMM 10B. Therefore, the battery 60, the electrical contacts and any other internal components are protected from corrosion and/or other similar damage resulting from exposure to the elements. Further, with or without the sealing members 66, the cover 62 can help to prevent the accidental disconnection of the battery 60 from the corresponding electrical contacts. In addition, the cover 62 can protect the battery 60 from damage resulting from the accidental contact with other objects during operation of the CMM 10B.

The one or more sealing members 66 can include o-rings, gaskets, silicone membranes, seals, sealants and/or any other material. Typically, the sealing members 66 are made of a compressible material (e.g., rubber, Viton, silicone, etc.) to further enhance the sealing effect between the cover 62 and the adjacent surfaces of the CMM 10B. The battery cover 62 may be constructed of one or more rigid or semi-rigid materials, including, but not limited to, aluminum, steel, stainless steel, iron, fiberglass, plastic, polycarbonate, acrylonitrile butadiene styrene (ABS), polystyrene or the like. In some arrangements, two or more different materials may be used to construct a single cover 62. Further, the cover 62 can include a solid, clear, translucent, transparent and/or other type of construction.

As illustrated in FIGS. 3-6, in the illustrated embodiment, the cover 62 can be connected to the base 20C using two fasteners 64. In the preferred embodiment, the fasteners 64 comprise bolts 64 that can be removed with a tool (e.g., an Allen Wrench or Hex Key). In this manner, the cover 62 is not easily removed or dislodged. Those of skill in art will appreciate that fewer or more than two fasteners 64 can be used and that the position of the fasteners 62 can be modified. For example, in FIG. 6, a fastener is shown being position on an upper, central portion of the cover 62. In certain embodiments, the use of the fasteners 64 in combination with the sealing member 66 can eliminate or reduce the amount of dust, water, other fluids and any other contaminants that contact the battery 60 and the other internal components of the CMM 10C. Thus, in one embodiment, the battery 60 is completely concealed within the base 20C.

In some embodiments, the cover is advantageously designed to meet and/or exceed one or more industry-recognized ratings for the protection of electrical components (e.g., IP65). Such industrial standards, as administered by the International Electrotechnical Commission (for Ingress Protection (IP) standards), National Electrical Manufacturers Association (NEMA) and others, ensure that a cover 62 or other electrical housing is adequately designed for a particular environment. For example, there are different Ingress Protection (IP) ratings for protection against exposure to moisture (e.g., dripping water, spraying water, immersion, submersion, etc.). In one embodiment, the cover 62 and other components of the battery protection system are capable of achieving a IP62 rating or better. The various characteristics (e.g., size, material, thickness, shape, etc.) of the cover 62 and the sealing members 66 can be modified to satisfy the desired level of protection.

The various devices, methods, procedures, and techniques described above provide a number of ways to carry out the invention. Of course, it is to be understood that not necessarily all objectives or advantages described may be achieved in accordance with any particular embodiment described herein. Also, although the invention has been disclosed in the context of certain embodiments and examples, it will be understood by those skilled in the art that the invention extends beyond the specifically disclosed embodiments to other alternative embodiments and/or uses and obvious modifications and equivalents thereof. Accordingly, the invention is not intended to be limited by the specific disclosures of preferred embodiments herein.

What is claimed is:

1. A coordinate measurement apparatus comprising:
   an articulated arm having a first end, a second end, a plurality of jointed arm segments therebetween, each arm segment including at least one position transducer for producing a position signal;
   a measurement probe attached to said first end of said articulated arm;
   a base coupled to the second end of the articulated arm, the base comprising a top side, a bottom side, a front side, a rear side, a left side and a right side, the base further comprising receptacle positioned on the front side of the base;
   a battery positioned within the receptacle such that a first portion of the battery lies within the receptacle and a second portion of the battery extends outside the receptacle;
   a cover member configured to be secured to the base and completely conceal the battery within the base, the cover member defining an enclosed space configured to receive the second portion of the battery and a front face configured to abut a front side of the base; and
   at least one compressible seal member at least partially situated between the front side of the base and the front face of the cover member;
   wherein the cover member substantially encloses the at least one removable battery.

2. The coordinate measurement apparatus of claim 1, further comprising at least one securement member configured to secure the cover to the base.

3. The coordinate measurement apparatus of claim 2, wherein the securement member is a bolt.

4. The coordinate measurement apparatus of claim 1, wherein the at least one seal member is selected from the group consisting of: gasket, o-ring, silicone membrane, seal and sealant.

5. The coordinate measurement apparatus of claim 1, wherein the cover is configured to prevent moisture from contacting the battery.

6. The coordinate measurement apparatus of claim 1, wherein the cover is configured to prevent dust from contacting the battery.

7. The coordinate measurement apparatus of claim 1, wherein the at least one seal member is attached to the cover.

8. The coordinate measurement apparatus of claim 1, wherein the cover is configured to satisfy at least one industry accepted standard for the enclosure of electrical components.

9. The coordinate measurement apparatus of claim 8, wherein the cover is configured to meet Ingress Protection 65 (IP65).

* * * * *